United States Patent
McArdle

(10) Patent No.: US 8,051,476 B2
(45) Date of Patent: Nov. 1, 2011

(54) METHOD AND SYSTEM FOR ACCESSING A SECURE AREA

(75) Inventor: James Michael McArdle, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 877 days.

(21) Appl. No.: 11/466,218

(22) Filed: Aug. 22, 2006

(65) Prior Publication Data

US 2008/0052522 A1    Feb. 28, 2008

(51) Int. Cl.
G06F 15/16    (2006.01)

(52) U.S. Cl. .......................................... 726/17; 713/182

(58) Field of Classification Search .......... 713/182–186; 726/17

See application file for complete search history.

(56) References Cited

U.S. PATENT DOCUMENTS

| | | | | |
|---|---|---|---|---|
| 4,641,017 A | * | 2/1987 | Lopata | 235/457 |
| 5,222,135 A | * | 6/1993 | Hardy et al. | 713/183 |
| 5,875,302 A | * | 2/1999 | Obhan | 709/225 |
| 5,920,628 A | * | 7/1999 | Indeck et al. | 360/25 |
| 6,024,286 A | * | 2/2000 | Bradley et al. | 235/492 |
| 6,385,729 B1 | * | 5/2002 | DiGiorgio et al. | 726/9 |
| 6,421,453 B1 | * | 7/2002 | Kanevsky et al. | 382/115 |
| 2004/0128512 A1 | * | 7/2004 | Sharma et al. | 713/176 |

OTHER PUBLICATIONS

J.D. Biersdorfer "Q&A; A Wealth of Information Inside a Magnetic Strip", Jan. 17, 2002, New York Times.*

* cited by examiner

*Primary Examiner* — Edan Orgad
*Assistant Examiner* — Brian Olion
(74) *Attorney, Agent, or Firm* — Yee & Associates, P.C.; Libby Z. Toub

(57) ABSTRACT

A system for accessing a secure area. In response to reading a plurality of security device orientations, the plurality of security device orientations are recorded. The plurality of recorded security device orientations are compared with stored security device orientation data. In response to determining that a match occurs between the plurality of recorded security device orientations and the stored security device orientation data, access is granted to the secure area.

9 Claims, 3 Drawing Sheets

METHOD AND SYSTEM FOR ACCESSING A SECURE AREA

BACKGROUND OF THE INVENTION

1. Field of the Invention

The present invention relates generally to an improved data processing system. More specifically, the present invention is directed to a computer implemented method, system, and computer useable program code for accessing a secure area utilizing a plurality of security badge orientations.

2. Description of the Related Art

Today, security badges are in general use because of the need to discriminate between authorized and unauthorized persons and between employees and non-employees, as well as other groups. Improved security of a facility or business is achieved when an effective security badge system is employed. Badge readers or scanners are used to control access to certain secure areas in a facility and to restrict the use of certain secure pieces of equipment, such as machinery, computers, or vehicles. The badge reader may be adapted to read a magnetic code placed on the security badge or to optically detect certain coded information placed on or in the badge.

Typically, businesses desire to maintain an extremely secure access control system for vital areas. Security badges and badge readers that rely exclusively on magnetically encoded data generally are undesirable if security is a major factor to the business because the magnetic information may readily be decoded. Similarly, security badges and badge readers that rely exclusively on visible symbols such as numbers, letters, or bar codes also may not be desirable when security is a major consideration because the code may readily be observed and copied. Moreover, a lost or stolen security badge with only a magnetic strip or code on it may present a security risk in that the lost or stolen security badge is not usually reported missing for at least 24 hours. Consequently, an unauthorized person may use the lost or stolen security badge during that period of time.

Other secure access control systems may uniquely link an individual to a security badge by some physiological factor, such as, for example, a photograph, fingerprint, hand geometry, signature, or voice print. Where a physiological link is employed, the issuance of such a security badge may be quite costly, time consuming, and suffer from other drawbacks as well. Further, the determination as to whether such a security badge is valid or expired often requires close scrutiny, which is not always possible.

Therefore, it would be beneficial to have an improved computer implemented method, system, and computer useable program code for accessing a secure area by using a plurality of security badge gestures or "secret handshakes."

SUMMARY OF THE INVENTION

Illustrative embodiments provide a computer implemented method, system, and computer usable program code for accessing a secure area. In response to reading a plurality of security device orientations, the plurality of security device orientations are recorded. The plurality of recorded security device orientations are compared with stored security device orientation data. In response to determining that a match occurs between the plurality of recorded security device orientations and the stored security device orientation data, access is granted to the secure area.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
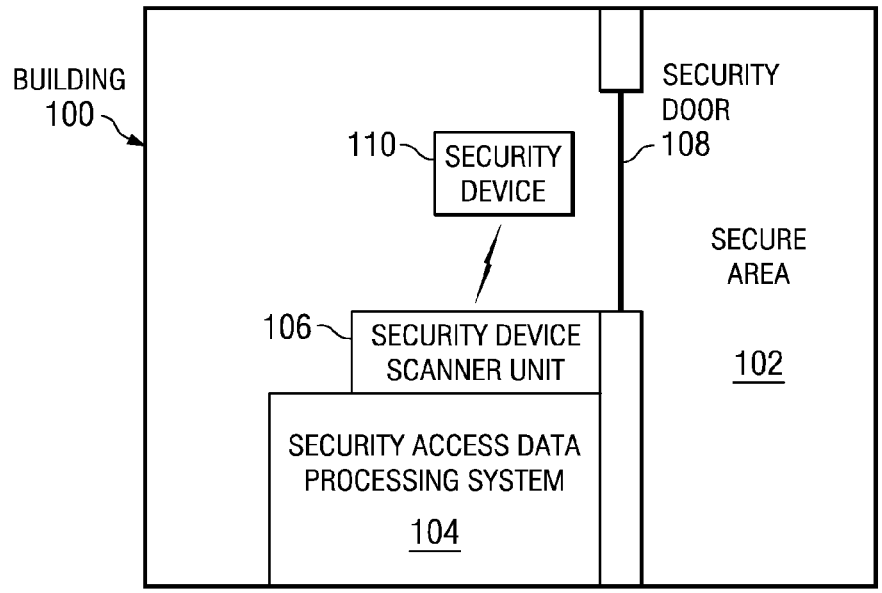
FIG. 1 is a pictorial representation of a building containing a secure area in which illustrative embodiments may be implemented.

With reference now to the figures and in particular with reference to FIG. 1, a pictorial representation of a building containing a secure area is shown in which illustrative embodiments may be implemented. Building 100 may be any type building in which restricted access is required into a secure area. Building 100 includes secure area 102, security access data processing system 104, security device scanner unit 106, and security door 108.

However, it should be noted that Building 100 is only intended for illustration purposes and is not meant as an architectural limitation on illustrative embodiments. For example, building 100 may contain a plurality of secure areas, access data processing systems, security device scanner units and security doors. In addition, building 100, itself, may be an entirely secure area. Also, building 100 may only have one access data processing system to manage access to building 100 and/or a plurality of secure areas. Further, security access data processing system 104 may be located outside secure area 102 as shown in this illustrative example, within secure area 102, in its own secure area, or at a remote site.

Secure area 102 may be any type of vital area requiring that access be restricted to only authorized individuals. Security access data processing system 104 may be any suitable data processing system capable of processing data and restricting access to secure area 102. For example, security access data processing system 104 may be an IntelliStation® computer, which is a product of International Business Machines Corporation, located in Armonk, N.Y. Although security access data processing system 104 may be a personal computer, other embodiments may be implemented in other types of data processing systems. For example, other embodiments may be implemented in a network computer. Security access data processing system 104 also preferably includes a graphical user interface (GUI) that may be implemented by means of systems software residing in computer readable media in operation within security access data processing system 104.

Security device scanner unit 106 may be any type of scanner, such as, for example, a laser scanner, capable of scanning or reading security device 110. Security device 110 may be, for example, a security badge or a security card. An authorized individual uses security device 110 to unlock or open security door 108 in order to gain access to secure area 102.

Security door 108 may be any suitable obstacle, such as a door, gate, or vault, capable of preventing unauthorized access to secure area 102.

Figure 2:
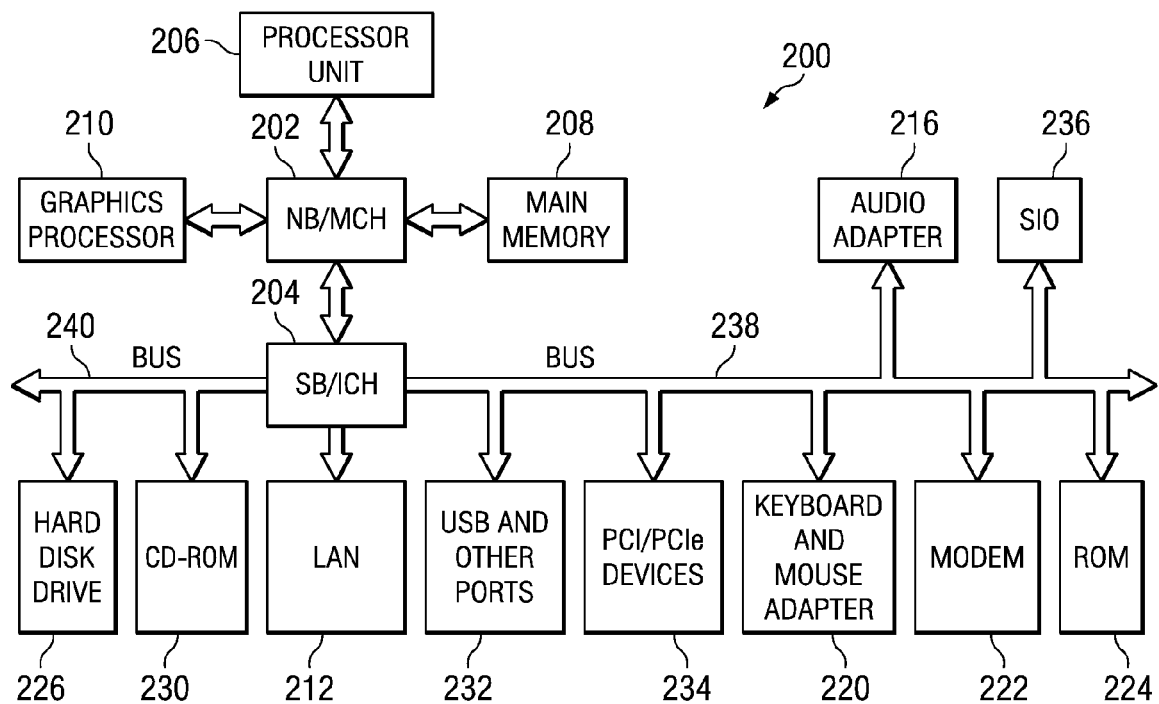
FIG. 2 is a block diagram of a data processing system in which illustrative embodiments may be implemented.

Next, FIG. 2 depicts a block diagram of a data processing system in which illustrative embodiments may be implemented. Data processing system 200 is an example of a computer, such as security access data processing system 104 in FIG. 1, in which code or instructions implementing the processes of illustrative embodiments may be located.

In the depicted example, data processing system 200 employs a hub architecture including a north bridge and memory controller hub (MCH) 202 and a south bridge and input/output (I/O) controller hub (ICH) 204. Processor unit 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processor 206. The processes of illustrative embodiments may be performed by processor 206 using computer implemented instructions, which may be located in a memory. An example of a memory is main memory 208, read only memory 224, or in one or more peripheral devices.

The hardware shown in FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 2. Additionally, the processes of illustrative embodiments may be applied to a multiprocessor data processing system.

The systems and components shown in FIG. 2 can be varied from the illustrative example shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative example shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, illustrative embodiments provide for a computer implemented method, apparatus, and computer usable program code for compiling source code and for executing code. The methods described with respect to the depicted embodiments may be performed in a data processing system, such as data processing system 200 shown in FIG. 2.

Illustrative embodiments provide a computer implemented method, system, and computer program product comprising a computer usable medium having computer useable program code embodied therein for accessing a secure area or device. A security access system's security device scanner reads a plurality, or series, of security device orientations. The security device may, for example, be a security badge or card. The security device orientation is in relation to the security device scanner. In addition, the security device scanner may read security device information, such as the user's name and identification number, contained on the security device. Then, the security device scanner records the plurality of security device orientations and the security device information in a memory unit within the security access system.

The security access system compares the recorded plurality of security device orientations and the security device information in memory with previously stored security device orientation data and security device information data in a storage device. The user of the security device, or a system administrator, inputs the stored data within the security access system. If a match occurs between the recorded data and the stored data, the security access system grants access to the secure area or device protected by illustrative embodiments. If a match does not occur between the recorded data and the stored data, the security access system denies access to the secure area or device protected by illustrative embodiments.

Using illustrative embodiments businesses, governmental agencies, or other entities, seeking increased security access control for secure vital areas and devices, require the user of the security device to perform a "secret handshake" or a specific sequence of security badge gestures in front of the security badge scanner. By requiring the secret handshake, illustrative embodiments make an entity's vital areas and devices more secure by adding another layer of identification beyond the mere presentation of the security device to the scanner. As a result, an unauthorized person that obtains a lost or stolen security device may not use the lost or stolen security device to access the entity's restricted access areas or devices protected by illustrative embodiments.

Figure 3:
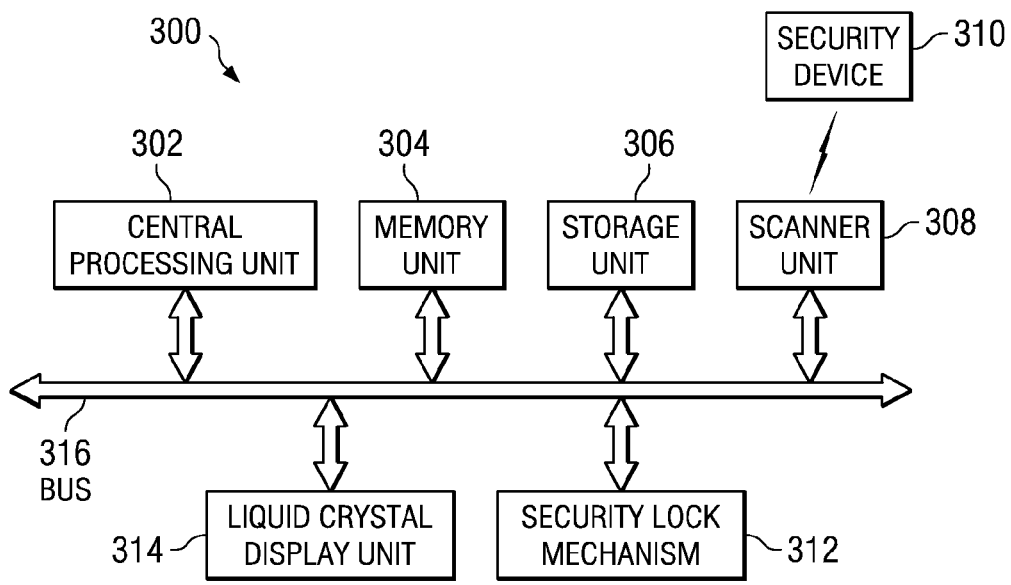
FIG. 3 is a block diagram of a data processing system that includes a scanner unit and a security lock mechanism in accordance with an illustrative embodiment.

With reference now to FIG. 3, a block diagram of a data processing system that includes a scanner unit and a security lock mechanism is depicted in accordance with an illustrative embodiment. Data processing system 300 may, for example, be implemented by data processing system 200 in FIG. 2. In addition, data processing system 300 may, for example, be security access data processing system 104 in FIG. 1.

Data processing system 300 may, for example, comprise of central processing unit (CPU) 302, memory unit 304, storage unit 306, scanner unit 308, security device 310, security lock mechanism 312, liquid crystal display (LCD) unit 314, and bus 316. However, it should be noted that data processing system 300 is only intended for exemplary purposes and is not meant as an architectural limitation to illustrative embodiments. Data processing system 300 may include any components necessary to perform processes of illustrative embodiments.

CPU 302 may be, for example, processor unit 206 in FIG. 2. CPU 302 provides the data processing capabilities of data processing system 300. An operating system runs on CPU 302 and coordinates and provides control of various components within data processing system 300. In addition, software applications executing on data processing system 300 may run in conjunction with the operating system.

Storage unit 306, such as, for example, hard disk drive 226 in FIG. 2, stores the instructions for the operating system and applications. The instructions are loaded into memory unit 304 for execution by CPU 302. Memory unit 304 may, for example, be main memory 208 in FIG. 2. CPU 302 performs processes of illustrative embodiments by executing the computer usable program code that is loaded into memory unit 304. Alternatively, the computer usable program code may be loaded into one or more peripheral devices for execution by CPU 302.

Storage unit 306 also stores security device orientation data and security device information data. The stored security device orientation data is data regarding the orientation of a security device, such as security device 310, when presented to a security device scanner, such as scanner unit 308, by a user. Security device 310 and scanner unit 308 may, for example, be security device 110 and security device scanner unit 106 in FIG. 1.

The stored security device orientation data is a specific sequence of security device positions, gestures, or secret handshakes between security device 310 and scanner unit 308. For example, the stored specific sequence of security device 310 positions may be upside down first, right side up second, and sideways third. Of course, it should be noted that illustrative embodiments are not restricted to the above-listed sequence or number of security device positions to access a secure area, such as, for example, secure area 102 in FIG. 1. Security device positions in relation to the scanner may be, for example, in increments of 45 degrees. However, it should be noted that illustrative embodiments may use any degree increment for security device positioning. Also, illustrative embodiments may utilize any sequence of security device positions to access the secure area or device, along with any number of positions within the sequence. Further, illustrative embodiments may utilize both the front side and the backside of security device 310 to determine correct security device orientation.

A system administrator, for example, may input the stored security device orientation data into data processing system 300. In this case, the system administrator determines the specific number and sequence of gestures for all security devices in order for a user of a security device to gain access to secure areas or devices. Alternatively, the user of each security device may input their own unique secret handshake into data processing system 300 to access secure areas or devices. Also, the user may use the same security device to access a plurality of secure areas or devices. Further, the user may utilize a different series of security device orientations to access each of the plurality of secure areas or devices, the same series of security device orientations to access the plurality of secure areas or devices, or any combination thereof.

The stored security device information data is data regarding information contained on security device 310. The information on security device 310 may be, for example, letters, numbers, symbols, pictures, or any combination thereof. Data processing system 300 may utilize the information contained on security device 310 to determine the orientation of security device 310. For example, security device 310 may include a unique design, logo, pattern, or series of lines that scanner unit 308 may read to determine the orientation of security device 310.

Also, the information on security device 310 may specifically identify the user of security device 310. For example, the information on security device 310 may be an employee name, identification number, and security clearance level. In addition, security device 310 may include biometric information of the user, such as a photograph and/or fingerprint, which also may be scanned by scanner unit 308. However, illustrative embodiments are not limited to the above-mentioned list of information contained on security device 310. Illustrative embodiments may include any necessary information or data on security device 310 in order to properly perform the function of allowing an authorized user to gain access to a secure area.

Data processing system 300 compares the stored security device orientation data and the security device information data with the user presented series of security device 310 orientations and with the information contained on security device 310, which scanner unit 308 obtains from security device 310 for data processing system 300. If a match occurs between the stored data and the user presented data, data processing system 300 allows the user to gain access to the secure area or device by unlocking or disabling security lock mechanism 312, Scanner unit 308 may, for example, be a laser scanner designed to scan security device 310. Security device 310 may be, for example, a security badge, a security card, or any other similar device that scanner unit 308 may scan to obtain orientation and information data.

Security lock mechanism 312 may, for example, be any type of electronic security device, mechanism, or system. Data processing system 300 may use security lock mechanism 312 to, for example, lock and unlock doors, vaults, or gates to secure areas. In addition, data processing system 300 may utilize security lock mechanism 312 to enable and disable, for example, machinery, electronic equipment, storage devices, or data processing system 300, itself.

Data processing system 300 utilizes LCD 314 to, for example, display messages to the user of security device 310. For example, LCD 314 may initially display a message, such as "Please present security badge to scanner for access into secure Area 51." LCD 314 also may display messages after scanner 308 scans security device 310 for information and orientation data, such as, for example, "Hello, Dr. Evil, access granted." or "Access denied, please try again." or "Please contact security prior to re-try."

In this illustrative example, data processing system 300 employs a bus architecture, such as bus 316. Bus 316 may comprise one or more buses. In addition, bus 316 may be implemented using any type of communication fabric or architecture that provides for a transfer of data between the different components or devices attached to bus 316.

Figure 4:
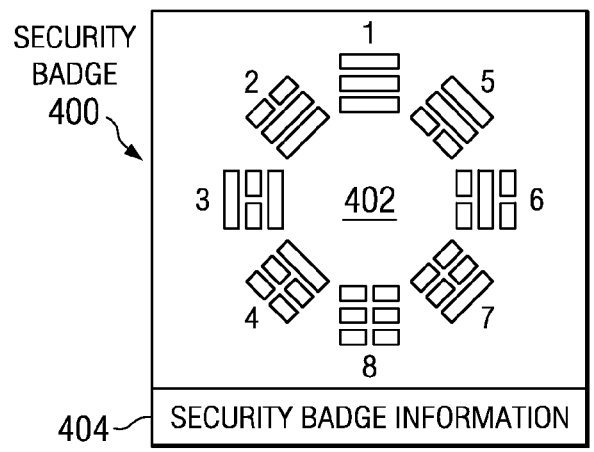
FIG. 4 is an exemplary illustration of a security badge in accordance with an illustrative embodiment.

With reference now to FIG. 4, an exemplary illustration of a security badge is depicted in accordance with an illustrative embodiment. Security badge 400 may, for example, be security device 110 in FIG. 1. Security badge 400 includes design 402 and security badge information 404.

A security badge scanner, such as, for example, security device scanner unit 106 in FIG. 1, uses design 402 to determine the orientation of security badge 400 when a user presents security badge 400 to the security badge scanner. Design 402 may be located on the front or on the back of security badge 400. In addition, design 402 may be located on the same side or on a different side as security badge information 404. Moreover, design 402 is only intended as an illustrative example and is not meant as a limitation on illustrative embodiments. Illustrative embodiments may, for example, use any design, pattern, picture, or logo to determine the orientation of security badge 400.

In this illustrative example, a user of security badge 400 may present security badge 400 to the security badge scanner in increments of 45 degrees. In other words, the user may present security badge 400 to the security badge scanner at 0, 45, 90, 135, 180, 225, 270, and 315 degrees. Each 45-degree increment presents a different security badge 400 orientation to the security badge scanner to comprise a series of security badge 400 orientations or secret handshakes to access a secure area, such as, for example, secure area 102 in FIG. 1. If the user presents the correct series of security badge 400 orientations to the security badge scanner, then a security access system, such as, for example, data processing system 300 in FIG. 3, opens or unlocks a security door, such as, for example, security door 108 in FIG. 1, to allow access to the secure area.

In addition, the series of security badge 400 orientations may be associated with security badge information 404. In other words, the security access system must link the security badge 400 orientations presented by the user to security badge information 404. Security badge information 404 identifies the user of security badge 400. For example, security badge information 404 may include user name and identification number. Security badge information 404 also is readable by the security badge scanner. If security badge information 404 does not match the user presented series of security badge 400 orientations, then the security access system denies access to the secure area or device protected by illustrative embodiments. If security badge information 404 does match the user presented series of security badge 400 orientations, then the security access system grants access to the secure area or device protected by illustrative embodiments. Thus, the security access system may directly associate security badge information 404 with a specific series of security badge 400 orientations.

However, it should be noted that illustrative embodiments are not restricted to associating design 402 with security badge information 404. Illustrative embodiments may only use design 402 without using security badge information 404. In other words, illustrative embodiments may only require the user to present the correct series of security badge 400 orientations to access the secure area or device. In addition, security badge 400 may only contain design 402 and not security badge information 404.

Figure 5:
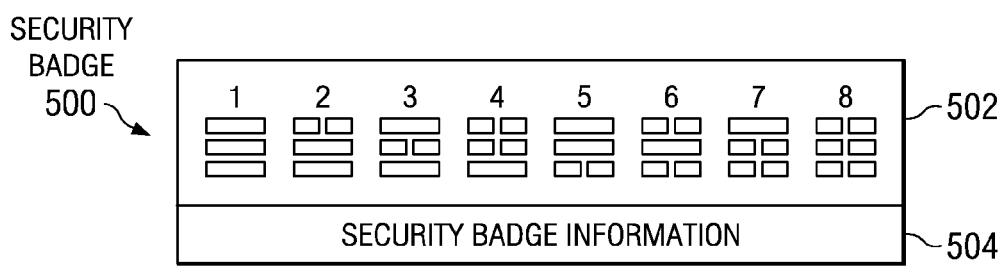
FIG. 5 is another exemplary illustration of a security badge in accordance with an illustrative embodiment.

With reference now to FIG. 5, another exemplary illustration of a security badge is depicted in accordance with an illustrative embodiment. Security badge 500 may, for example, be security device 310 in FIG. 3. Security badge 500 includes design 502 and security badge information 504.

A security badge scanner, such as, for example, scanner unit 308 in FIG. 3, uses design 502 to determine the orientation of security badge 500 when a user presents security badge 500 to the security badge scanner. Design 502 is only intended as an illustrative example and is not meant as a limitation on illustrative embodiments. Similar to the illustrative example of FIG. 4, the security badge 500 user presents a series of security badge 500 orientations or secret handshakes to the security badge scanner to access a secure area, such as, for example, secure area 102 in FIG. 1.

Figure 6:
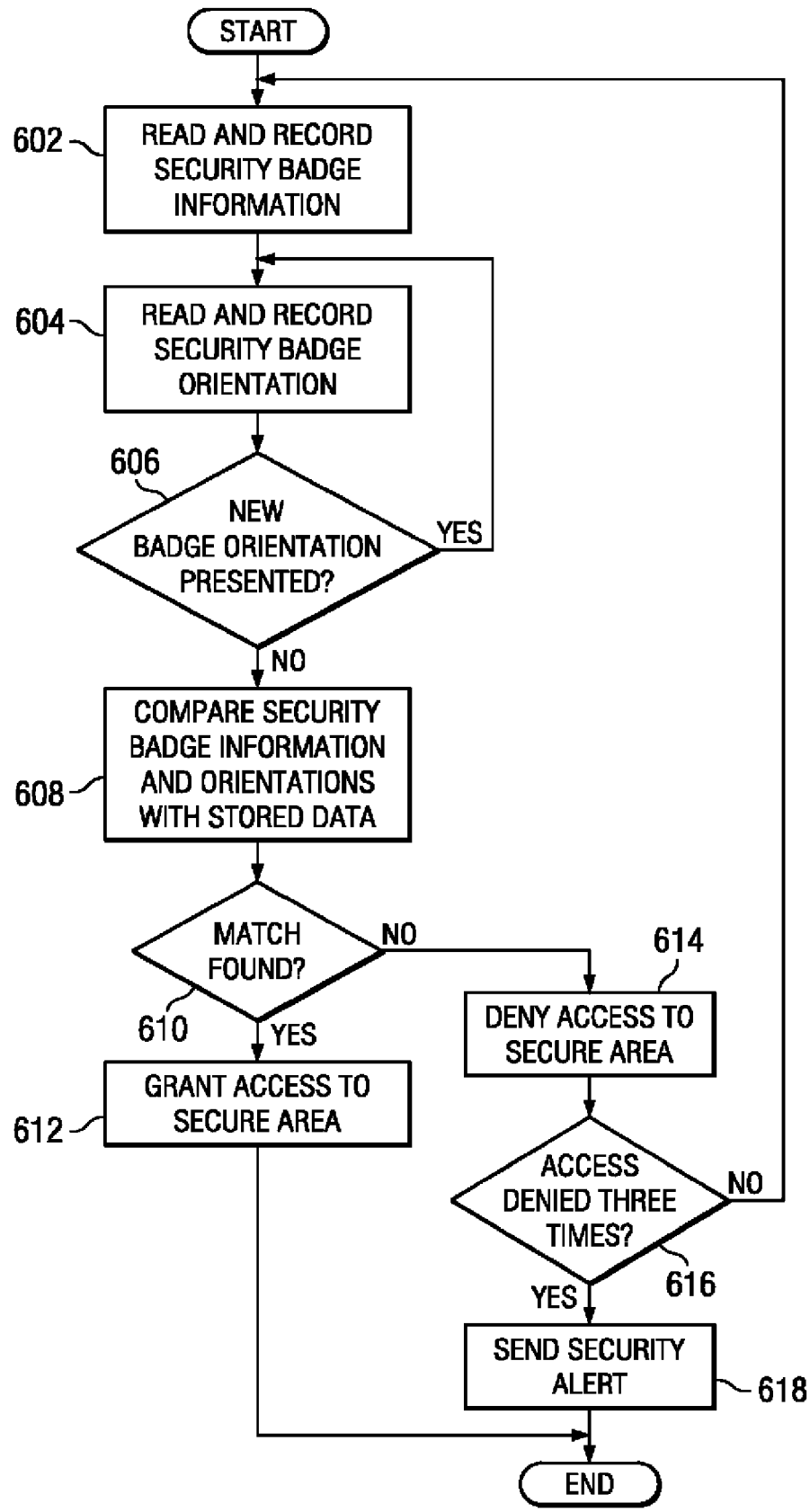
FIG. 6 is a flowchart illustrating an exemplary process for accessing a secure area by using a plurality of security badge orientations in accordance with an illustrative embodiment.

With reference now to FIG. 6, a flowchart illustrating an exemplary process for accessing a secure area by using a plurality of security badge orientations is shown in accordance with an illustrative embodiment. The process shown in FIG. 6 may be implemented in a security access system, such as, for example, data processing system 300 in FIG. 3.

The process begins when the security access system's security badge scanner, such as scanner unit 308 in FIG. 3, reads and records security badge information data, such as security badge information 404 in FIG. 4 (step 602). Subsequent to, or concurrently with, reading and recording security badge information data in step 602, the security badge scanner reads and records the security badge orientation using a security badge design, such as, for example, design 402 in FIG. 4 (step 604). After reading and recording the security badge orientation in step 604, the security badge scanner makes a determination as to whether a user of the security badge presents a new security badge orientation to the security badge scanner (step 606).

If the user presents a new security badge orientation, yes output of step 606, then the process returns to step 604 where the security badge scanner reads and records the new security badge orientation. The security access system may require the user to present the new security badge orientation within, for example, 5 seconds. However, it should be noted that illustrative embodiments are not restricted to a 5 second interval between presentations of a new security badge orientation. Illustrative embodiments may utilize any time interval between new security badge orientation scans. For example, illustrative embodiments may require a user to present a new security badge orientation every 1 to 10 seconds.

If the user does not present a new security badge orientation, no output of step 606, then the security access system compares the user presented security badge information and the plurality of security badge orientations with stored security badge information and plurality of security badge orientations in a storage unit, such as, for example storage unit 306 in FIG. 3 (step 608). Subsequent to comparing the user presented security badge information and series of security badge orientations with the stored security badge information and series of security badge orientations in step 608, the security access system makes a determination as to whether a match is found between the presented data and the stored data (step 610). If a match is found, yes output of step 610, then the security access system grants the security badge user access to the secure area, such as, for example, secure area 102 in FIG. 1, or to the secure device protected by illustrative embodiments by unlocking or disabling a security lock mechanism, such as, for example, security lock mechanism 312 in FIG. 3 (step 612). The process terminates thereafter. If a match is not found, no output of step 610, then the security access system denies the security badge user access to the secure area or device by continuing to lock or enable the security lock mechanism protecting the secure area or device (step 614).

After denying the security badge user access to the secure area or device in step 614, the security access system makes a determination as to whether the security badge user has been denied access three consecutive times (step 616). If the security badge user has not been denied access three times, no output of step 616, the security access system may, for example, display a message in an LCD, such as, for example, LCD unit 314 in FIG. 3, requesting that the security badge user re-try access and then returns the process to step 602 where the security badge scanner again reads and records the security badge information. If the security badge user has been denied access three times, yes output of step 616, then the security access system sends a security alert to, for example, security personnel or the system administrator and displays a message in the LCD stating, for example, that the security badge user must contact security before access re-try is permitted (step 618). The process terminates thereafter.

Thus, illustrative embodiments provide a computer implemented method, system, and computer usable program code for accessing a secure area or device. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable storage medium providing program code for use by or in connection with a computer or any instruction execution system. For the purposes of this description, a computer-usable or computer readable storage medium can be any tangible apparatus that can contain or store the program for use by or in connection with the instruction execution system, apparatus, or device.

The storage medium can be an electronic, magnetic, optical, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for accessing a secure area, the computer implemented method comprising:

inputting by a user of a security device a specific sequence of a plurality of different positions of the security device used to access a secure area to form stored security device orientation data, wherein the user utilizes the security device to access a plurality of different secure areas and utilizes a different specific sequence of security device positions to access each of the plurality of different secure areas;

presenting by the user the security device that includes security device information including an identification number and biometric fingerprint information that identifies the user of the security device and a unique design including eight different series of rectangular shapes placed at forty-five degree increments in a circular configuration on the security device in front of a digital scanner for scanning by the digital scanner the security device information and all of the unique design including the eight different series of rectangular shapes placed at forty-five degree increments in the circular configuration on the security device to access a secure area;

performing by the user the specific sequence of the plurality of different positions of the security device in front of the digital scanner so that an orientation of the unique design including the eight different series of rectangular shapes placed at forty-five degree increments in the circular configuration on the security device in front of the digital scanner changes with each position in the specific sequence of the plurality of different positions;

scanning by the digital scanner the security device information and the orientation of the unique design including the eight different series of rectangular shapes placed at forty-five degree increments in the circular configuration on the security device in each position of the specific sequence of the plurality of different positions of the security device in front of the digital scanner;

recording the security device information to form recorded security device information that includes the identification number and the biometric fingerprint information that identifies the user of the security device;

recording the orientation of the unique design including the eight different series of rectangular shapes placed at forty-five degree increments in the circular configuration on the security device in each position of the specific sequence of the plurality of different positions of the security device in front of the digital scanner to form a plurality of recorded orientations of the unique design including the eight different series of rectangular shapes placed at forty-five degree increments in the circular configuration on the security device in the specific sequence of the plurality of different positions of the security device in front of the digital scanner;

determining whether a new orientation of the unique design including the eight different series of rectangular shapes placed at forty-five degree increments in the circular configuration on the security device is presented to the digital scanner within a predetermined period of time;

responsive to determining that a new orientation of the unique design including the eight different series of rectangular shapes placed at forty-five degree increments in the circular configuration on the security device is not presented within the predetermined period of time, comparing the recorded security device information that includes the identification number and the biometric fingerprint information that identifies the user of the security device with stored security device information data and comparing the plurality of recorded orientations of the unique design including the eight different series of rectangular shapes placed at forty-five degree increments in the circular configuration on the security device in the specific sequence of the plurality of different positions of the security device in front of the digital scanner with the stored security device orientation data;

determining whether the recorded security device information that includes the identification number and the biometric fingerprint information that identifies the user of the security device is associated with the plurality of recorded orientations of the unique design including the eight different series of rectangular shapes placed at forty-five degree increments in the circular configuration on the security device in the specific sequence of the plurality of different positions of the security device in front of the digital scanner;

responsive to determining that a match occurs between the recorded security device information that includes the identification number and the biometric fingerprint information that identifies the user of the security device and stored security device information data and between the plurality of recorded orientations of the unique design including the eight different series of rectangular shapes placed at forty-five degree increments in the circular configuration on the security device in the specific sequence of the plurality of different positions of the security device in front of the digital scanner and the stored security device orientation data and to determining that the recorded security device information that includes the identification number and the biometric fingerprint information that identifies the user of the security device is associated with the plurality of recorded orientations of the unique design including the eight different series of rectangular shapes placed at forty-five degree increments in the circular configuration on the security device in the specific sequence of the plurality of different positions of the security device in front of the digital scanner, granting access to the secure area;

responsive to determining that a match does not occur between the recorded security device information that includes the identification number and the biometric fingerprint information that identifies the user of the security device and stored security device information data or between the plurality of recorded orientations of the unique design including the eight different series of rectangular shapes placed at forty-five degree increments in the circular configuration on the security device in the specific sequence of the plurality of different positions of the security device in front of the digital scanner and the stored security device orientation data or to determining that the recorded security device information that includes the identification number and the biometric fingerprint information that identifies the user of the security device is not associated with the plurality of recorded orientations of the unique design including the eight different series of rectangular shapes placed at forty-five degree increments in the circular configuration on the security device in the specific sequence of the plurality of different positions of the security device in front of the digital scanner, denying access to the secure area; and responsive to determining that access has been denied to the secure area a predetermined number of times, sending a security alert to a system administrator.

2. The computer implemented method of claim 1, wherein the plurality of recorded orientations of the unique design including the eight different series of rectangular shapes placed at forty-five degree increments in the circular configuration on the security device in the specific sequence of the plurality of different positions of the security device in front of the digital scanner are orientations of the security device in relation to the digital scanner.

3. The computer implemented method of claim 1, wherein the security device is one of a security badge or security card.

4. A data processing system for accessing a secure area, comprising:

a bus system;

a storage device connected to the bus system, wherein the storage device includes a set of instructions; and a processing unit connected to the bus system, wherein the processing unit executes the set of instructions to input by a user of a security device a specific sequence of a plurality of different positions of the security device used to access a secure area to form stored security device orientation data, wherein the user utilizes the security device to access a plurality of different secure areas and utilizes a different specific sequence of security device positions to access each of the plurality of different secure areas; present by the user the security device that includes security device information including an identification number and biometric fingerprint information that identifies the user of the security device and a unique design including eight different series of rectangular shapes placed at forty-five degree increments in a circular configuration on the security device in front of a digital scanner for scanning by the digital scanner the security device information and all of the unique design including the eight different series of rectangular shapes placed at forty-five degree increments in the circular configuration on the security device to access a secure area; perform by the user the specific sequence of the plurality of different positions of the security device in front of the digital scanner so that an orientation of the unique design including the eight different series of rectangular shapes placed at forty-five degree increments in the circular configuration on the security device in front of the digital scanner changes with each position in the specific sequence of the plurality of different positions; scan by the digital scanner the security device information and the orientation of the unique design including the eight different series of rectangular shapes placed at forty-five degree increments in the circular configuration on the security device in each position of the specific sequence of the plurality of different positions of the security device in front of the digital scanner; record the security device information to form recorded security device information that includes the identification number and the biometric fingerprint information that identifies the user of the security device; record the orientation of the unique design including the eight different series of rectangular shapes placed at forty-five degree increments in the circular configuration on the security device in each position of the specific sequence of the plurality of different positions of the security device in front of the digital scanner to form a plurality of recorded orientations of the unique design including the eight different series of rectangular shapes placed at forty-five degree increments in the circular configuration on the security device in the specific sequence of the plurality of different positions of the security device in front of the digital scanner; determine whether a new orientation of the unique design including the eight different series of rectangular shapes placed at forty-five degree increments in the circular configuration on the security device is presented to the digital scanner within a predetermined period of time; compare the recorded security device information that includes the identification number and the biometric fingerprint information that identifies the user of the security device with stored security device information data and compare the plurality of recorded orientations of the unique design including the eight different series of rectangular shapes placed at forty-five degree increments in the circular configuration on the security device in the specific sequence of the plurality of different positions of the security device in front of the digital scanner with the stored security device orientation data in response to determining that a new orientation of the unique design including the eight different series of rectangular shapes placed at forty-five degree increments in the circular configuration on the security device is not presented within the predetermined period of time; determine whether the recorded security device information that includes the identification number and the biometric fingerprint information that identifies the user of the security device is associated with the plurality of recorded orientations of the unique design including the eight different series of rectangular shapes placed at forty-five degree increments in the circular configuration on the security device in the specific sequence of the plurality of different positions of the security device in front of the digital scanner; grant access to the secure area in response to determining that a match occurs between the recorded security device information that includes the identification number and the biometric fingerprint information that identifies the user of the security device and stored security device information data and between the plurality of recorded orientations of the unique design including the eight different series of rectangular shapes placed at forty-five degree increments in the circular configuration on the security device in the specific sequence of the plurality of different positions of the security device in front of the digital scanner and the stored security device orientation data and to determining that the recorded security device information that includes the identification number and the biometric fingerprint information that identifies the user of the security device is associated with the plurality of recorded orientations of the unique design including the eight different series of rectangular shapes placed at forty-five degree increments in the circular configuration on the security device in the specific sequence of the plurality of different positions of the security device in front of the digital scanner; deny access to the secure area in response to determining that a match does not occur between the recorded security device information that includes the identification number and the biometric fingerprint information that identifies the user of the security device and stored security device information data or between the plurality of recorded orientations of the unique design including the eight different series of rectangular shapes placed at forty-five degree increments in the circular configuration on the security device in the specific sequence of the plurality of different positions of the security device in front of the digital scanner and the stored security device orientation data or to determining that the recorded security device information that includes the identification number and the biometric fingerprint information that identifies the user of the security device is not associated with the plurality of recorded orientations of the unique design including the eight different series of rectangular shapes placed at forty-five degree increments in the circular configuration on the security device in the specific sequence of the plurality of different positions of the security device in front of the digital scanner; and send a security alert to a system administrator in response to determining that access has been denied to the secure area a predetermined number of times.

5. A computer program product comprising a computer readable storage device having computer usable program code embodied therein that is executable by a computer for accessing a secure area, the computer program product comprising:

computer usable program code for inputting by a user of a security device a specific sequence of a plurality of different positions of the security device used to access a secure area to form stored security device orientation data, wherein the user utilizes the security device to access a plurality of different secure areas and utilizes a different specific sequence of security device positions to access each of the plurality of different secure areas;

computer usable program code for presenting by the user the security device that includes security device information including an identification number and biometric fingerprint information that identifies the user of the security device and a unique design including eight different series of rectangular shapes placed at forty-five degree increments in a circular configuration on the security device in front of a digital scanner for scanning by the digital scanner the security device information and all of the unique design including the eight different series of rectangular shapes placed at forty-five degree increments in the circular configuration on the security device to access a secure area;

computer usable program code for performing by the user the specific sequence of the plurality of different positions of the security device in front of the digital scanner so that an orientation of the unique design including the eight different series of rectangular shapes placed at forty-five degree increments in the circular configuration on the security device in front of the digital scanner changes with each position in the specific sequence of the plurality of different positions;

computer usable program code for scanning by the digital scanner the security device information and the orientation of the unique design including the eight different series of rectangular shapes placed at forty-five degree increments in the circular configuration on the security device in each position of the specific sequence of the plurality of different positions of the security device in front of the digital scanner;

computer usable program code for recording the security device information to form recorded security device information that includes the identification number and the biometric fingerprint information that identifies the user of the security device;

computer usable program code for recording the orientation of the unique design including the eight different series of rectangular shapes placed at forty-five degree increments in the circular configuration on the security device in each position of the specific sequence of the plurality of different positions of the security device in front of the digital scanner to form a plurality of recorded orientations of the unique design including the eight different series of rectangular shapes placed at forty-five degree increments in the circular configuration on the security device in the specific sequence of the plurality of different positions of the security device in front of the digital scanner;

computer usable program code for determining whether a new orientation of the unique design including the eight different series of rectangular shapes placed at forty-five degree increments in the circular configuration on the security device is presented to the digital scanner within a predetermined period of time;

computer usable program code for comparing the recorded security device information that includes the identification number and the biometric fingerprint information that identifies the user of the security device with stored security device information data and comparing the plurality of recorded orientations of the unique design including the eight different series of rectangular shapes placed at forty-five degree increments in the circular configuration on the security device in the specific sequence of the plurality of different positions of the security device in front of the digital scanner with the stored security device orientation data in response to determining that a new orientation of the unique design including the eight different series of rectangular shapes placed at forty-five degree increments in the circular configuration on the security device is not presented within the predetermined period of time;

computer usable program code for determining whether the recorded security device information that includes the identification number and the biometric fingerprint information that identifies the user of the security device is associated with the plurality of recorded orientations of the unique design including the eight different series of rectangular shapes placed at forty-five degree increments in the circular configuration on the security device in the specific sequence of the plurality of different positions of the security device in front of the digital scanner;

computer usable program code for granting access to the secure area in response to determining that a match occurs between the recorded security device information that includes the identification number and the biometric fingerprint information that identifies the user of the security device and stored security device information data and between the plurality of recorded orientations of the unique design including the eight different series of rectangular shapes placed at forty-five degree increments in the circular configuration on the security device in the specific sequence of the plurality of different positions of the security device in front of the digital scanner and the stored security device orientation data and to determining that the recorded security device information that includes the identification number and the biometric fingerprint information that identifies the user of the security device is associated with the plurality of recorded orientations of the unique design including the eight different series of rectangular shapes placed at forty-five degree increments in the circular configuration on the security device in the specific sequence of the plurality of different positions of the security device in front of the digital scanner;

computer usable program code for denying access to the secure area in response to determining that a match does not occur between the recorded security device information that includes the identification number and the biometric fingerprint information that identifies the user of the security device and stored security device information data or between the plurality of recorded orientations of the unique design including the eight different series of rectangular shapes placed at forty-five degree increments in the circular configuration on the security device in the specific sequence of the plurality of different positions of the security device in front of the digital scanner and the stored security device orientation data or to determining that the recorded security device information that includes the identification number and the biometric fingerprint information that identifies the user of the security device is not associated with the plurality of recorded orientations of the unique design including the eight different series of rectangular shapes placed at forty-five degree increments in the circular configuration on the security device in the specific sequence of the plurality of different positions of the security device in front of the digital scanner; and computer usable program code for sending a security alert to a system administrator in response to determining that access has been denied to the secure area a predetermined number of times.

6. The computer program product of claim 5, wherein the plurality of recorded orientations of the unique design including the eight different series of rectangular shapes placed at forty-five degree increments in the circular configuration on the security device in the specific sequence of the plurality of different positions of the security device in front of the digital scanner are orientations of the security device in relation to the digital scanner.

7. The computer implemented method of claim 1, wherein each forty-five degree increment is a different security device orientation in relation to the digital scanner to comprise the plurality of different positions of the security device in front of the digital scanner to access the secure area.

8. The computer implemented method of claim 1, further comprising:

responsive to determining that a new orientation of the unique design including the eight different series of rectangular shapes placed at forty-five degree increments in the circular configuration on the security device is presented within the predetermined period of time, scanning by the digital scanner the new orientation of the unique design including the eight different series of rectangular shapes placed at forty-five degree increments in the circular configuration on the security device in the specific sequence of the plurality of different positions of the security device and recording the new orientation of the unique design.

9. An apparatus for accessing a secure area, the apparatus comprising:

means for inputting by a user of a security device a specific sequence of a plurality of different positions of the security device used to access a secure area to form stored security device orientation data, wherein the user utilizes the security device to access a plurality of different secure areas and utilizes a different specific sequence of security device positions to access each of the plurality of different secure areas;

means for presenting by the user the security device that includes security device information including an identification number and biometric fingerprint information that identifies the user of the security device and a unique design including eight different series of rectangular shapes placed at forty-five degree increments in a circular configuration on the security device in front of a digital scanner for scanning by the digital scanner the security device information and all of the unique design including the eight different series of rectangular shapes placed at forty-five degree increments in the circular configuration on the security device to access a secure area;

means for performing by the user the specific sequence of the plurality of different positions of the security device in front of the digital scanner so that an orientation of the unique design including the eight different series of rectangular shapes placed at forty-five degree increments in the circular configuration on the security device in front of the digital scanner changes with each position in the specific sequence of the plurality of different positions;

means for scanning by the digital scanner the security device information and the orientation of the unique design including the eight different series of rectangular shapes placed at forty-five degree increments in the circular configuration on the security device in each position of the specific sequence of the plurality of different positions of the security device in front of the digital scanner;

means for recording the security device information to form recorded security device information that includes the identification number and the biometric fingerprint information that identifies the user of the security device;

means for recording the orientation of the unique design including the eight different series of rectangular shapes placed at forty-five degree increments in the circular configuration on the security device in each position of the specific sequence of the plurality of different positions of the security device in front of the digital scanner to form a plurality of recorded orientations of the unique design including the eight different series of rectangular shapes placed at forty-five degree increments in the circular configuration on the security device in the specific sequence of the plurality of different positions of the security device in front of the digital scanner;

means for determining whether a new orientation of the unique design including the eight different series of rectangular shapes placed at forty-five degree increments in the circular configuration on the security device is presented to the digital scanner within a predetermined period of time;

means for comparing the recorded security device information that includes the identification number and the biometric fingerprint information that identifies the user of the security device with stored security device information data and comparing the plurality of recorded orientations of the unique design including the eight different series of rectangular shapes placed at forty-five degree increments in the circular configuration on the security device in the specific sequence of the plurality of different positions of the security device in front of the digital scanner with the stored security device orientation data in response to determining that a new orientation of the unique design including the eight different series of rectangular shapes placed at forty-five degree increments in the circular configuration on the security device is not presented within the predetermined period of time;

means for determining whether the recorded security device information that includes the identification number and the biometric fingerprint information that identifies the user of the security device is associated with the plurality of recorded orientations of the unique design including the eight different series of rectangular shapes placed at forty-five degree increments in the circular configuration on the security device in the specific sequence of the plurality of different positions of the security device in front of the digital scanner;

means for granting access to the secure area in response to determining that a match occurs between the recorded security device information that includes the identification number and the biometric fingerprint information that identifies the user of the security device and stored security device information data and between the plurality of recorded orientations of the unique design including the eight different series of rectangular shapes placed at forty-five degree increments in the circular configuration on the security device in the specific sequence of the plurality of different positions of the security device in front of the digital scanner and the stored security device orientation data and to determining that the recorded security device information that includes the identification number and the biometric fingerprint information that identifies the user of the security device is associated with the plurality of recorded orientations of the unique design including the eight different series of rectangular shapes placed at forty-five degree increments in the circular configuration on the security device in the specific sequence of the plurality of different positions of the security device in front of the digital scanner;

means for denying access to the secure area in response to determining that a match does not occur between the recorded security device information that includes the identification number and the biometric fingerprint information that identifies the user of the security device and stored security device information data or between the plurality of recorded orientations of the unique design including the eight different series of rectangular shapes placed at forty-five degree increments in the circular configuration on the security device in the specific sequence of the plurality of different positions of the security device in front of the digital scanner and the stored security device orientation data or to determining that the recorded security device information that includes the identification number and the biometric fingerprint information that identifies the user of the security device is not associated with the plurality of recorded orientations of the unique design including the eight different series of rectangular shapes placed at forty-five degree increments in the circular configuration on the security device in the specific sequence of the plurality of different positions of the security device in front of the digital scanner; and means for sending a security alert to a system administrator in response to determining that access has been denied to the secure area a predetermined number of times.

* * * * *